Nov. 1, 1938. W. O. NORMANDIN 2,135,215
VENTILATION-CONTROL MEANS FOR MOTOR VEHICLES
Filed Jan. 25, 1937 2 Sheets-Sheet 2

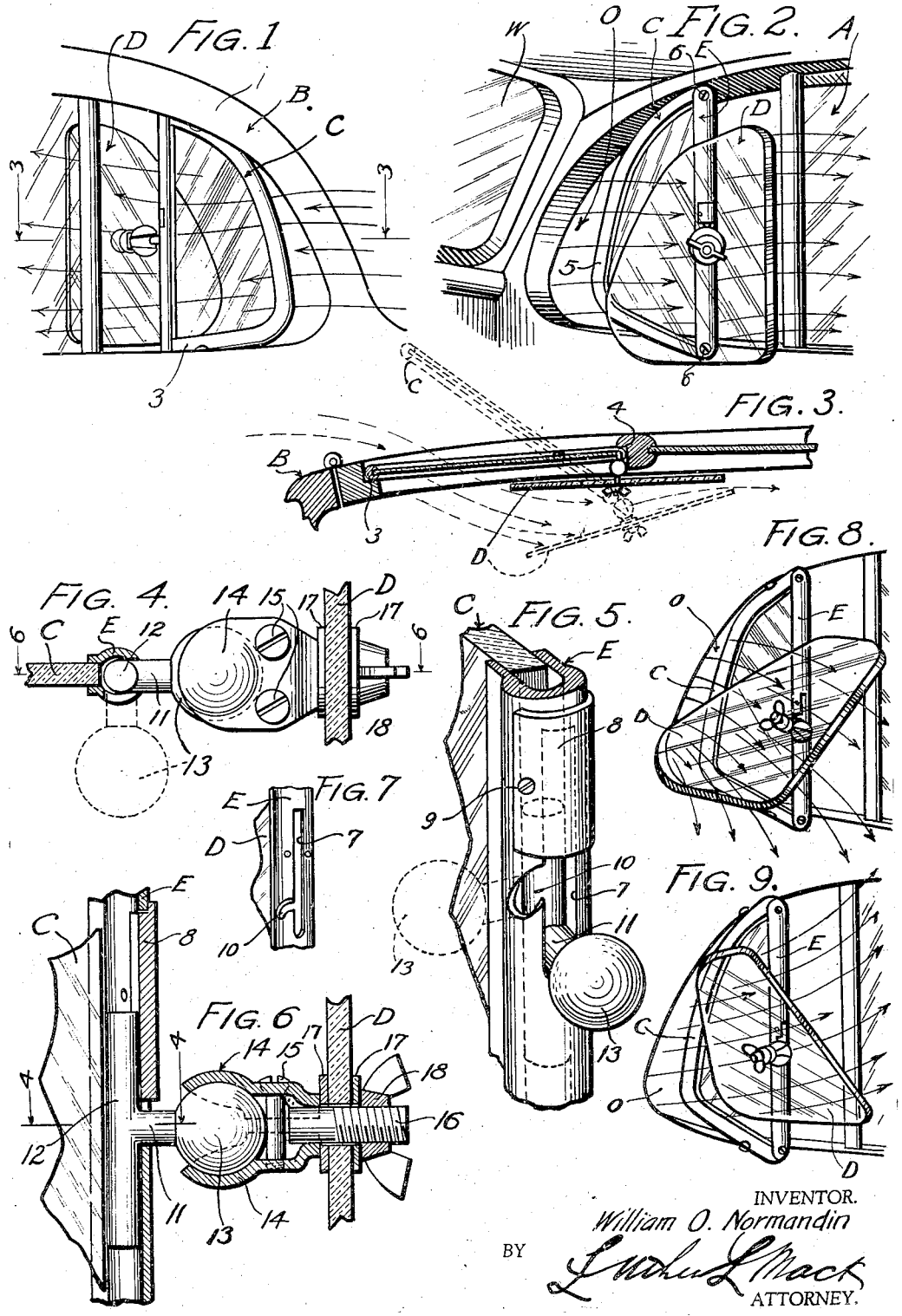

INVENTOR.
William O. Normandin
BY
ATTORNEY.

Patented Nov. 1, 1938

2,135,215

UNITED STATES PATENT OFFICE 2,135,215

VENTILATION-CONTROL MEANS FOR MOTOR VEHICLES

William O. Normandin, Los Angeles, Calif.

Application January 25, 1937, Serial No. 122,125

12 Claims. (Cl. 296—44)

This invention relates to and has for an object the provision of a ventilation control means for motor vehicle bodies of a pair of permanently attached and relatively adjustable transparent wings operatively mounted in a door or window of an automobile, one of which wings forms a support for the other wing and is permanently and rotatably mounted in a window opening and adapted to be adjusted so that its forward edge will swing outwardly and its inner edge inwardly as distinguished from the conventional type of wings which open reversely with respect thereto.

The invention contemplates the provision of an auxiliary wing, that is, one that is mounted on the fixed supporting wing and is adjustable universally thereon for the purpose of deflecting air currents rearwardly, upwardly, downwardly or forwardly which enter the automobile when the supporting wing is in open position.

A further object is to provide a pair of wind wings, one of which is rotatably but permanently mounted in a window opening, and the other of which is rotatable universally on the first mentioned wing and is capable, when said first mentioned wing is in closed position, of being disposed in overlapping position relative thereto so that the auxiliary wing will not interfere with the opening or closing of the window opening.

Still other objects include the provision of means for adjusting the auxiliary wing relative to the primary wing and for holding the auxiliary wing in adjusted positions.

Other objects may appear as the description progresses.

I have shown a preferred form of invention embodying my aforesaid improvements in the accompanying drawings, in which Fig. 1 is a perspective view of a portion of the exterior of a closed automobile body, showing the primary and auxiliary wings operatively mounted in a window opening thereof;

Fig. 2 is a perspective view of the same, as seen from the interior of the body;

Fig. 3 is a fragmentary sectional plan of an automobile body, showing the primary and auxiliary wings in closed position, and with the open position thereof indicated in broken lines, as seen on line 3—3 of Fig. 1;

Fig. 4 is a fragmentary section of the wind wings and connecting parts, as seen on line 4—4 of Fig. 6;

Fig. 5 is a fragmentary perspective view of the connecting means between the two wind wings;

Fig. 6 is a sectional elevation of the same on line 6—6 of Fig. 4;

Fig. 7 is a perspective view of a portion of the structure shown in Fig. 5, but on a reduced scale;

Fig. 8 is a view corresponding to Fig. 2, except that it shows the auxiliary wing inclined so as to deflect the air currents downwardly;

Fig. 9 is a view corresponding to Fig. 8, except that the auxiliary wing is inclined so as to deflect the air currents upwardly.

Figure 10:
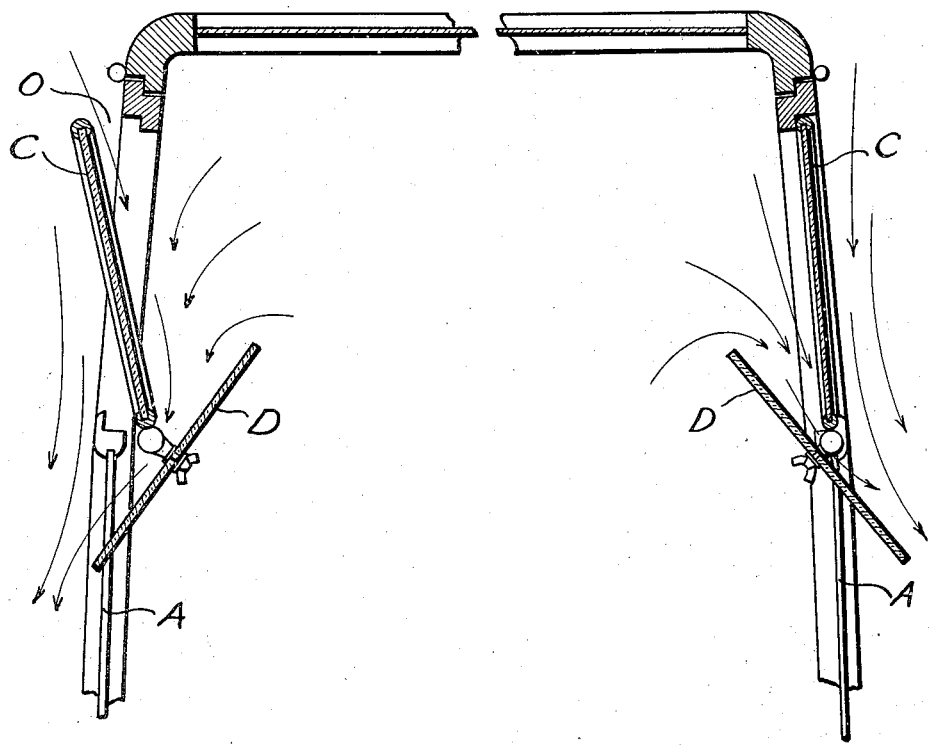
Fig. 10 is a fragmentary plan view of a motor vehicle body, showing my improved ventilation control means mounted differently adjusted on opposite sides.

My invention, as disclosed herein, is adapted to be mounted at any convenient or desirable point on an enclosed type of automobile body, as at B, but, as shown herein, the structure of my invention, as illustrated in the drawings, is shown operatively mounted in a front window opening O at the rear of a wind shield W and forwardly of a sliding transparent closure A usually provided in automobile doors.

The invention includes a primary wing C and an auxiliary wing D formed of glass or other transparent material, such as Cellophane.

The wings C conform to conventional equipment on modern motor cars and are pivotally mounted at points 1 and 2 in the body B so that they may be adjustable on a vertical axis for admitting air through the opening O to the interior of the car. Said wings C have a channeled metal frame on their top, bottom and forward edges, as usually provided, while the rear edges thereof are conventionally free of any frame members, but I provide a channeled frame member E on the rear edge of the transparent wing D, as shown in Fig. 5, whereby the auxiliary wing D may be permanently supported on the wing C. It will be understood also that the conventional wings C open so that their forward edges are internally disposed while their rear edges are externally disposed on the automobile body for the purpose of deflecting the air currents rearwardly and outwardly of the body. As distinguished from the conventional type of wing C, I arrange the wings C so that their forward edges are externally disposed and their rear edges are internally disposed so as to induce a flow of air during the movement of the car inwardly of the body. To this end, as shown in Fig. 3, the margins of the opening O are provided with front shoulders 3 and rear shoulders 4 so that the wing C, when in closed position, will seat at its front and rear edges on said shoulders and may be opened only outwardly at its front edge, as shown by dotted lines in Fig. 3. The channeled member 3 which is applied to the rear edge of the wing C may be suitably affixed to the frame 5 as by means of screws 6—6 at the top and bottom, as indicated in Fig. 2.

It will be noted, by reference to Figs. 5 and 7, that the member E has an elongated, vertically disposed slot 7 in the outer arcuately formed web of the channel, which is partially covered by a plate 8 secured to the web of the channel as by means of the screws 9, and said slot 7 has a transverse portion 10 near the bottom so as to receive a stem 11, which has a T portion 12 slidable vertically in the member E between the rear edge of the wing C and the web of member E, and also a ball 13 on the end of the stem 11, as shown particularly in Figs. 5 and 6.

The portion 10 of slot 7 is slightly inclined so that the stem 11, when moved upwardly in slot 7, may be sufficiently rotated in the member E as to dispose the stem 11 in the lateral slot 10 and hold the wing C in adjusted position at right angles to its normal operating position, as indicated in Fig. 3. The auxiliary wing D is universally adjustable on the wing C and includes a socket comprising corresponding members 14 frictionally held together as by means of one or more screws 15 so that the socket members will partially encompass the ball 13 and thereby form a universal joint by means of which the wings C and D may be relatively adjusted.

One of the socket members 14 has welded, or otherwise suitably attached thereto, a threaded stem 16 which is adapted to extend through the wing D and washers 17—17 on opposite sides of said wing so that a wing nut or other suitable device 18 on the opposite side of the wing D from the socket members may be threaded onto the stem 16 and thus clamp the socket to the auxiliary wing D.

The T 12 is limited in its upward sliding movement in the channeled member E by its engagement with the lower edge of plate 8, and the stem 11 normally, when the window is open, is disposed either in the bottom of slot 7 or at the extremity of the lateral slot 10, depending upon the particular air conditions and the desired position of the auxiliary wing relative to the primary wing C.

As shown in Figs. 1, 2, 8 and 9, it will be observed that the wings C and D are relatively adjustable to a desired extent for increasing or decreasing, and for regulating and controlling the flow of air into and through the automobile body. For instance, air which enters the opening O forwardly of wing C, when the two wings are disposed as shown in Figs. 2 and 3, is caught by the auxiliary wing D and deflected backwardly into the car. When the auxiliary wing D is inclined, as shown in Figs. 8 and 9, the air is deflected downwardly and upwardly respectively. The universal joint between the two wings permits the adjustment of the auxiliary wing relative to the opening O and the primary wing C so that they may be not only inclined horizontally and vertically but also to intermediate degrees for effecting perfect ventilation of the interior of the car body and for directing the air to points desired. The wing D being mounted on the wing C, does not in any way affect the opening and closing of the wing C, due to the fact particularly that the ball and socket joint permits the swinging of wings D into substantial parallelism with wing C by slightly lifting wing D and moving the stem 11 upwardly and thence laterally in slot 10 where it will be retained until further adjustment is necessary.

It will be noted by reference to Fig. 10 that I have shown on the right-hand side of the vehicle body the wing C in completely closed position with the sliding panel A completely open and the auxiliary wing D disposed at an angle through the opening at the rear of the wing C. The arrows in the view showing this arrangement of the wings indicate that a deflection of the air currents outwardly and also the induced flow of the air currents from the interior of the car outwardly between the two wings. In such case the deflected outer currents create a partial vacuum and induce a flow of air from the interior of the car outwardly.

On the left-hand side of the machine, as shown in Fig. 10, I have shown wing C partially open and wing D disposed substantially as shown on the right-hand side of the body, so that air currents from the interior of the car may be induced outwardly and at the same time, air from the exterior will be forced inwardly and rearwardly.

It will be obvious that other adjustments may be effected in order to meet different conditions of use, to overcome or prevent excessive drafts within the body, to create drafts at desired points, and to thoroughly ventilate or enclose the interior of the body.

It will thus be understood that I provided a completely adjustable, desirable and efficient means for manually controlling the ventilation of a closed automobile body from the interior of the body, and that although I have shown in the drawings and described in the specifications a preferred form of invention, my invention is subject to modification within the scope of the appended claims, without departing from the spirit thereof.

What I claim is:

1. A ventilation control means for motor vehicles, comprising a pair of permanently connected transparent wings, one of which is adapted to be mounted in a window opening of a motor vehicle body on a vertical axis located between the front and rear edges of the wing to permit free movement of said edges into and out of said opening, and the other of which is wholly supported on said first mentioned wing, said first mentioned wing forming a closure for the opening, and said second mentioned wing being adjustable on the first mentioned wing for permitting the closing thereof at will.

2. A ventilation control means for motor vehicles, comprising, in combination with a motor vehicle body having an opening therein, a primary wing adjustable on a vertical axis in said opening between the front and rear edges thereof, with said edges movable freely into and out of said opening, and an auxiliary wing wholly supported on said primary wing and adjustable in, to and from position relative to the primary wing and permitting said primary wing to be moved into position for closing said opening.

3. A ventilation control means for motor vehicles, comprising, in combination with a motor vehicle body having an opening therein, a primary wing adjustable on a vertical axis in said opening, and an auxiliary wing wholly supported on said primary wing and adjustable in, to and from position relative to the primary wing and permitting said primary wing to be moved into position for closing said opening, the connections between said wings including means permitting the universal adjustment of the auxiliary wing relative to the primary wing.

4. A ventilation control means for motor vehicles, comprising, in combination with a body having an opening therein, a primary wind wing adjustable on an axis for opening and closing, and an auxiliary wing universally adjustable relative to and wholly supported on said primary wing for deflecting air currents entering said body through said opening in any desired direction.

5. A ventilation control means for motor vehicles, comprising, in combination with a body having an opening therein, a primary wind wing adjustable on an axis for opening and closing, and an auxiliary wing universally adjustable relative to and wholly supported on said primary wing for deflecting air currents entering said body through said opening in any desired direction, the mounting for said auxiliary wing including a member vertically slidable on said primary wing and a joint between said wings permitting the inclination of said auxiliary wing in selected planes relative to said primary wing.

6. A ventilation control means for motor vehicles, comprising, in combination with a body having an opening therein, a primary wind wing adjustable on an axis for opening and closing, an auxiliary wing universally adjustable relative to and wholly supported on said primary wing for deflecting air currents entering said body through said opening in any desired direction, and means for supporting said auxiliary wing selectively in a plurality of positions on said primary wing.

7. A ventilation control means for motor vehicles, comprising a primary wing adapted to be adjustably mounted in a window opening, and an auxiliary wing means secured to said wings between the upper and lower ends thereof whereby the auxiliary wing may be supported selectively in a plurality of positions relative to said primary wing, and also inclinable selectively in any of said positions into a selected plane for directing air currents to desired points internally of the body.

8. A ventilation control means for motor vehicles, comprising a primary wing adapted to be adjustably mounted in a window opening so that its forward edges may be extended outwardly and its rear edges extended inwardly to a desired extent, and an auxiliary wing universally adjustable on the rear edge of said primary wing and wholly supported thereby, whereby said wings may be relatively adjusted and inclined for directing air currents entering the body through said opening to the desired points.

9. A ventilation control means for motor vehicles, comprising, in combination with a body having a window opening, a primary wing adjustable in said opening and forming a closure therefor, said wing being openable so that its forward and rear edges are extended out of said opening to induce a flow of air into said body, an auxiliary wing and means secured to said wings between their upper and lower edges for universally adjustably supporting the auxiliary wing on said primary wing for directing a flow of air in a selected direction.

10. A ventilation control means for motor vehicles, comprising, in combination with a body having a window opening, a primary wing adjustable in said opening on an axis located between the front and rear edges thereof, said primary wing forming a closure for said opening, said wing being openable to dispose its edges out of said opening so as to induce a flow of air into said body, an auxiliary wing for directing a flow of air in a selected direction, and means connecting said wings at a single point between the upper and lower edges thereof, permitting the adjustment of said auxiliary wing bodily to a plurality of positions relative to the primary wing whereby the ventilation control means will be operative when the primary wing is open and the auxiliary wing will not interfere with the closing of said primary wing.

11. A ventilation control means for motor vehicles, comprising, in combination with the body having an opening therein, a primary wing adjustably mounted on said body for regulating the closing of said opening, a channeled member affixed to the rear edge of said primary wing, an auxiliary wing and a universal connection between said primary and auxiliary wings, including a member slidable on the channeled member of said primary wing and a universal joint between said slidable member and said auxiliary wing, permitting the inclination of the auxiliary wing relative to the primary wing in selected planes.

12. A ventilation control means for motor vehicles, comprising, in combination with the body having an opening therein, a primary wing adjustably mounted on said body for regulating the closing of said opening, a channeled member affixed to the rear edge of said primary wing, an auxiliary wing and a universal connection between said primary and auxiliary wings, including a member slidable on the channeled member of said primary wing, a universal joint between said slidable member and said auxiliary wing, permitting the inclination of the auxiliary wing relative to the primary wing in selected planes, and means associated with said connecting means for supporting the auxiliary wing selectively in a plurality of positions.

WILLIAM O. NORMANDIN.